United States Patent Office 2,749,640
Patented June 12, 1956

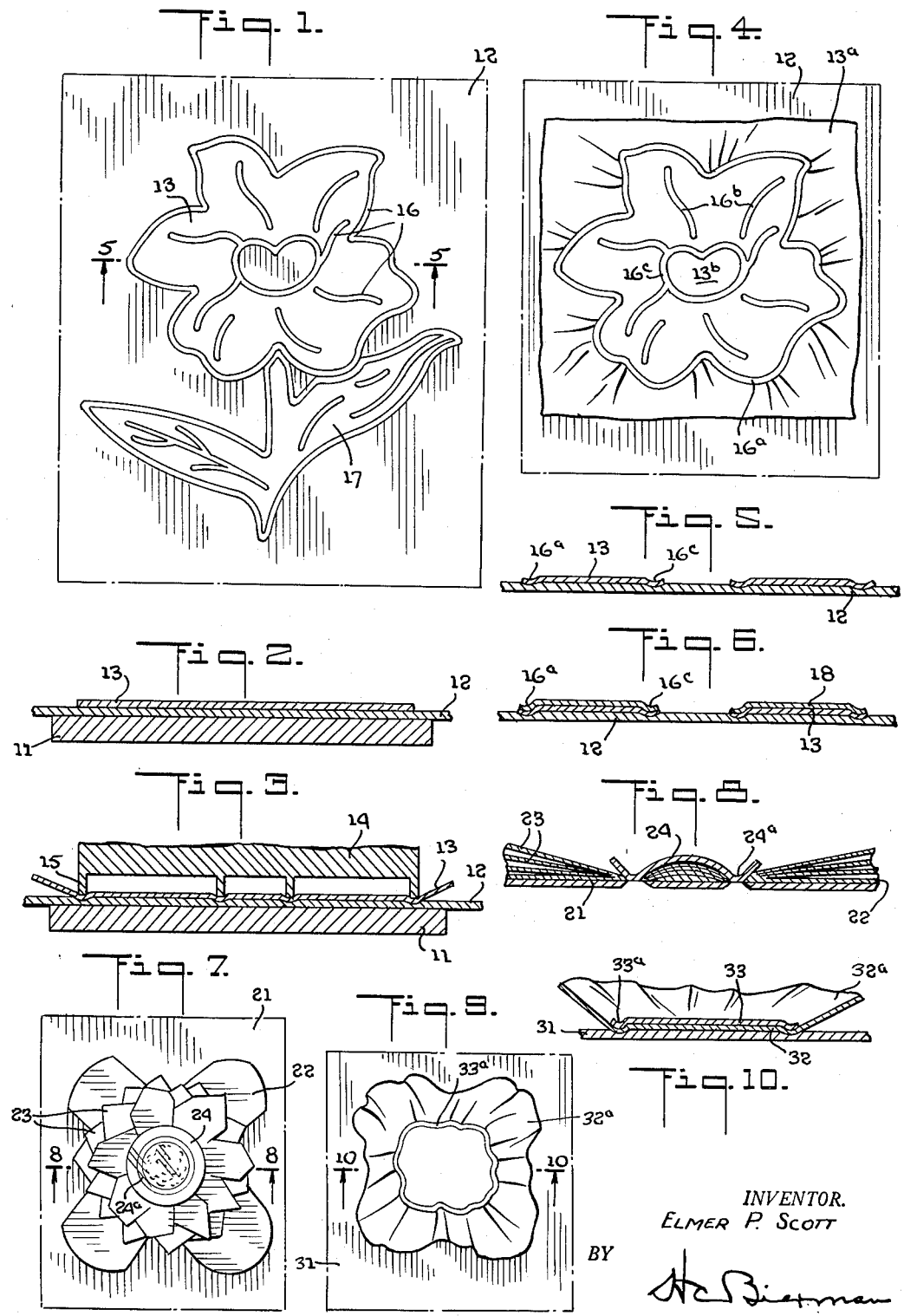

2,749,640

THERMOPLASTIC DESIGN ARTICLE

Elmer P. Scott, New York, N. Y.

Application July 1, 1953, Serial No. 365,422

4 Claims. (Cl. 41—24)

The present invention relates to a novel ornamental article formed of a plurality of thermoplastic layers or sheets fused together in such a manner as to form a design and to a method for forming this novel article. More particularly, it relates to a novel ornamental article made by superimposing one or more layers of a thermoplastic material upon a base layer of like material and then fusing all said layers along predetermined lines to form a desired design.

In the simplest form of my invention, a base layer of vinyl chloride-acetate resin is placed on a hard metal bed and then a second layer of like material is superimposed on the base layer. Next a die with downwardly extending heated ridges on its face is pressed upon the layers to fuse them together. As the heated die is applied to the adjacent layers of vinyl material, the layers will fuse together wherever engaged by the ridges. Thus, it can be seen that the design desired is predetermined by the design of the heated ridges. The outermost ridge on the face of the die must constitute a closed line so that it can form the periphery of the desired design. Moreover, the outermost ridge, which forms the peripheral fuse line of the design, scores the top layer so that the portion of that layer outwardly of the peripheral fuse line can be removed by tearing this outermost portion along such peripheral fuse line. The top layer will then present the design as appearing upon a background which in reality is the base layer. The layers are generally of different colors so that the appearance of the design is striking to the eye.

Accordingly, it is an object of the present invention to provide an article comprised of a plurality of thermoplastic layers, which layers are fused together along predetermined lines to form a design.

It is a further object of the present invention to provide a method of forming an article of the above described character.

It is a still further object of the present invention to provide several modifications thereof, which modifications employ layers of superimposed and fused together thermoplastic material.

The design formed herein finds particular use in adaptation to household articles, such as drapes, curtains, tablecloths and the like, where said articles are formed of a thermoplastic material.

Other objects and advantages of the present invention will become more apparent as it is described in detail below with particular reference to the accompanying drawings, wherein Figure 1 is a front view of a design formed in accord with the present invention;

Figure 2 is a sectional view showing two layers of thermoplastic material placed on a metal bed prior to the design forming treatment;

Figure 3 is a sectional view showing a heated die in the process of fusing the layers shown in Figure 2;

Figure 4 is a front view of the layers shown in Figure 3 immediately after the fusing operation but prior to removal of the outermost portions of the top layer;

Figure 5 is a view taken on lines 5—5 of Figure 1 and looking in the direction of the arrows;

Figure 6 is a view similar to Figure 5 but showing a modification of the present invention in which a plurality of layers are superimposed on the base layer of thermoplastic material;

Figure 7 is a front view of a still further modification of the present invention;

Figure 8 is a sectional view taken on lines 8—8 of Figure 7 and looking in the direction of the arrows;

Figure 9 is a front view of yet another modification of the present invention; and Figure 10 is a sectional view taken on lines 10—10 of Figure 9 and looking in the direction of the arrows.

With particular reference to Figure 2 there is shown a base layer 12 of thermoplastic material disposed on a hard flat metal bed 11 and a second layer 13 of thermoplastic material superimposed on the base layer. Generally, the layers 12 and 13 are made of a thermoplastic material such as vinyl chloride-acetate resin, although other thermoplastic materials may be equally used.

Next a die 14, having downwardly extending heated ridges 15 on the face thereof and which form a flower design, is pressed against the layers 12 and 13 disposed on the flat metal bed 11, as shown in Figure 3. When the die 15 is placed against the layers 12 and 13, these layers will be heat fused together by the ridges 15 along lines 16 hereafter referred to as fuse lines. Thus, the ridges 15 form the flower design corresponding to the fuse lines 16 as seen in Figure 4. It is to be noted that the outermost ridge 15a of the die 14 is a closed line so that it forms the periphery of the flower design.

Upon removal of the die 14, the two fused layers 12 and 13 will then have the appearance shown in Figure 4. The portion 13a of the layer 13, which lies outwardly of the peripheral fuse line 16a, may be removed by simply tearing this outer portion away from the formed flower design along peripheral fuse line 16a. The fusing along peripheral line 16a has a scoring effect so that the outer portion 13a will rip very easily along this line thereby leaving a flower design as seen in the top half of Figure 1.

The layers 12 and 13 are also fused together along fuse lines 16b which, in addition to giving a design effect, also serve as strengthening ribs to hold the layers together. The innermost fuse line 16c, like peripheral fuse line 16a, is also a closed line, and, if desired, the innermost portion 13b may be removed in the same manner as portion 13a to expose base layer 12.

In order to complete the flower design a third layer of like vinyl material 17 may be then placed upon the lower half of the base layer 12. The entire operation as described above is repeated with the exception that a heated die is used which has ridges to give a design of a stem for the flower.

In Figure 6 there is shown a modification of the design in Figure 1. This is formed by disposing a layer 18 of colorless vinyl material over vinyl layer 13 prior to fusing to form the flower design and over the vinyl layer 17 prior to fusing to form the flower stem. This layer 18 serves to give the entire design an opaque or smoky effect and to reduce the brightness of the colors of the layers 13 and 17. The outermost portions of layers 13, 17, and 18, of course, are removed by tearing along the peripheral fuse lines of the flower and stem designs.

A further modification of the principles disclosed herein is shown in Figures 7 and 8. This modification, however, employs layers which have been preformed as to design and which are centrally fused together to form the complete design. In this case, a layer 21 of vinyl material serves as a base layer to carry vinyl layer 22 which has been preformed in the shape of an X or cross to simulate the outer leaves of the flower. A plurality of vinyl layers 23 are centrally superimposed on layer 22. Each layer 23 is preshaped so as to simulate a plurality of flower petals. Next, a circular vinyl layer 24 is centrally located on top of the layers 23 to simulate the central portion of the flower. Then a heated die element bearing a circular and downwardly extending heated ridge is employed to fuse together all of the above described layers along the fuse line 24a. The result is a flower design wherein all the leaves and petals are loose so as to give the appearance of being life-like.

In Figure 9 and Figure 10 there is shown a final modification of the present invention wherein there is formed a flower design in which the outer portion of the flower has a ruffled effect. In this modification, a layer of vinyl material 32 preformed to simulate a flower is superimposed on a base layer 31. Both these layers 31 and 32 are covered by a layer 33 which extends beyond the periphery of preformed layer 32. Again a heated die element having a downwardly extended ridge forming a closed line is pressed against the central portion of the layers to fuse all the layers along the fuse line 33a. The outermost portion of the layer 33 is then removed along scored fuse line 33a exposing the outer portion 32a of preshaped layer 32. The fusing along the lines 33a has the effect of drawing or ruffling the outer portion 32a. The layer 32 will be thus ruffled to give the entire flower design a distinctive appearance.

It is to be understood in discussing the modifications of Figures 7 through 10 that the vinyl layers referred to are layers of vinyl chloride-acetate, although other similar thermoplastic resins may be equally employed.

It should be further understood that my invention is adaptable to all types of designs and is not limited to flower designs.

While the invention has been described in detail and shown with respect to the accompanying drawings, it is not to be limited to such details since many changes and modifications may be made in the invention without departing from the spirit and scope thereof. Hence, it is desired to cover any and all forms and modifications of the invention which may come within the language and scope of any one or more of the appended claims.

I claim:

1. A thermoplastic design article comprising a base sheet of a thermoplastic material, a design sheet of thermoplastic material on said base and fused thereto along the periphery only of said design sheet, said base extending beyond said design sheet, said design sheet being also fused to said base within said design along a plurality of disconnected lines.

2. A thermoplastic design article comprising a base sheet of a thermoplastic material, a design sheet of thermoplastic material on said base and fused thereto along the periphery only of said design sheet, said base extending beyond said design sheet, said design sheet being also fused to said base within said design along a plurality of disconnected lines, said design sheet being further fused to said base along an internal closed line and said base being visible within said closed line.

3. A thermoplastic design article comprising a base sheet of a thermoplastic material, a design sheet of thermoplastic material on said base and fused thereto along the periphery only of said design sheet, said base extending beyond said design sheet, a second design sheet superposed on said first design sheet and fused thereto and to said base at a central portion of said sheets along a closed line, the edges of said sheets being of irregular shape and extending loosely beyond said closed line.

4. A thermoplastic design article comprising a base sheet of a thermoplastic material, a design sheet of thermoplastic material on said base and fused thereto along the periphery only of said design sheet, said base extending beyond said design sheet, said design sheet being also fused to said base within said design along a plurality of disconnected lines, a translucent sheet superposed on said design sheet and fused thereto along said lines, whereby the color visible through said translucent sheet gives a smoky effect whereas the color visible at said lines is bright.

References Cited in the file of this patent

UNITED STATES PATENTS

| | | |
|---|---|---|
| 1,834,078 | Stein | Dec. 1, 1931 |
| 1,978,048 | Heintz | Oct. 23, 1934 |
| 2,304,787 | Avery | Dec. 15, 1942 |
| 2,470,493 | Karfiol et al. | May 17, 1949 |
| 2,478,771 | Mafko | Aug. 9, 1949 |
| 2,482,981 | Kamrass | Sept. 27, 1949 |
| 2,485,323 | Schwartz | Oct. 18, 1949 |
| 2,631,646 | Gannon et al. | Mar. 17, 1953 |
| 2,633,442 | Caldwell | Mar. 31, 1953 |
| 2,710,046 | Markus et al. | June 7, 1955 |